(12) United States Patent
Hansen

(10) Patent No.: US 7,142,149 B2
(45) Date of Patent: Nov. 28, 2006

(54) MENSURATION FOR THE CONFORMAL RANGE MIGRATION ALGORITHM

(75) Inventor: Charles T. Hansen, Palos Verdes Estates, CA (US)

(73) Assignee: Raytheon Company, Waltham, MA (US)

(*) Notice: Subject to any disclaimer, the term of this patent is extended or adjusted under 35 U.S.C. 154(b) by 273 days.

(21) Appl. No.: 10/967,956

(22) Filed: Oct. 19, 2004

(65) Prior Publication Data

US 2006/0028372 A1 Feb. 9, 2006

Related U.S. Application Data

(63) Continuation-in-part of application No. 10/919,733, filed on Aug. 17, 2004, now Pat. No. 6,987,479, and a continuation-in-part of application No. 10/911,438, filed on Aug. 4, 2004.

(51) Int. Cl.
    *G01S 13/90* (2006.01)
(52) U.S. Cl. .................. 342/25 R; 342/25 A; 342/25 F
(58) Field of Classification Search .... 342/25 R–25 F, 342/64, 96, 161–162
    See application file for complete search history.

(56) References Cited

U.S. PATENT DOCUMENTS 6,384,766 B1 * 5/2002 Ulander ................... 342/25 R
6,809,681 B1 * 10/2004 Niechayev ................... 342/159
2005/0073455 A1 * 4/2005 Chow et al. ............... 342/25 F

OTHER PUBLICATIONS

Marechal, "Tomographic Formulation of Interferometric SAR for Terrain Elevation Mapping", IEEE Trans. on Geoscience and Remote Sensing, vol. 33, No. 3, May 1995. pp. 726-739.*

* cited by examiner

*Primary Examiner*—Thomas H. Tarcza
*Assistant Examiner*—Isam Alsomiri
(74) *Attorney, Agent, or Firm*—Leonard A. Alkov; Karl A. Vick

(57) ABSTRACT

A radar system is mounted on a moving platform moving along a great circle. The radar comprises a radar receiver for digitizing radar returns having a phase from a scatterer (target) in a scene. A computer focuses the phase of the radar returns from the scatterer in the scene, using cylindrical coordinates to arrive at an image. An initial position estimate of the scatterer (target) within the image is made. This initial position is converted from cylindrical coordinates to geodesic coordinates of initial latitude, initial longitude and initial elevation. The geodesic coordinates are used to compare with a database descriptive of earth's surface. The initial elevation is replaced with that contained in the database. A second scatterer (target) location is computed using the database elevation. The second target location is compared with the first target location to obtain a difference. If the difference is above a threshold, the second scatterer location is substituted for the initial position estimate. This is iterated until the scatterer location difference is less than the threshold.

8 Claims, 5 Drawing Sheets

MENSURATION FOR THE CONFORMAL RANGE MIGRATION ALGORITHM

This application is a continuation in part of U.S. Patent and Trademark Office application Ser. No. 10/919,733, titled Conformal Range Migration Algorithm (CRMA) "KARMA" (PD 03W138), filed Aug. 17, 2004, and Ser. No. 10/911,438, titled Motion Compensation for Convolutional SAR Algorithms (PD 03W137), filed Aug. 4, 2004.

BACKGROUND OF THE INVENTION

1. Field of Invention

This invention is in the field of locating scatterers generating radar returns presented within a Synthetic Aperture Radar image.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns creating a SAR image generated by the transmitted pulses along a known path of the platform make up a frame length and is descriptive of a scene. During the frame length, amplitude as well as phase information returned from each of the pulses, for each of many range bins, is preserved. The SAR image descriptive of a scene is formed from the coherent combination of the amplitude and phase of return(s) within each range bin, motion compensated for spatial displacement of the moving platform during the acquisition of the returns for the duration of the frame length.

The plurality of pulses transmitted during an SAR frame length, when coherently combined and processed, result in image quality comparable to a longer antenna, corresponding approximately to the "length" traveled by the antenna during the frame length. The clarity of a SAR image is dependent on the quality of the motion compensation applied to each radar return prior to SAR image computation. The SAR process depends on the coherent, phase accurate summing of radar returns. Slight deviations in the accuracy of the motion compensation of incoming pulses introduces distortions over the whole SAR image, reducing its utility.

The Range Migration Algorithm (RMA), a method based on convolution, is a popular way to focus the radar returns forming a SAR image, assuming straight line motion over a flat earth. Inaccuracies arise with the RMA method because the earth is not flat, being in fact ellipsoidal. Some of these inaccuracies are corrected in an ad hoc fashion, but become less accurate as the range and squint angle become larger. One parent application describes a method for compensating radar returns from a spherical, non-planar scene acquired with a platform moving in a non-linear track, the Conformal Range Migration Algorithm (CRMA).

One aspect of SAR mapping using above methods is the need to identify accurately the ground location of the target presented within the SAR image. In the prior art, ground target location was approximated using heuristic methods, but errors in positioning targets within the SAR image arose. It is the minimization of target positioning errors within the SAR image that this invention strives to achieve.

SUMMARY OF THE INVENTION

Target position coordinates are computed from a SAR map from a scene on earth, said earth having a great circle centered with respect to said earth's center, an axis passing through said earth's center and a first radius. Said great circle is contained in a first plane. Said scene has at least one radar scatterer. The scene adjacent to said great circle on a local scene centerline circle. The centerline circle in a second plane, said second plane parallel to said first plane, said centerline circle having a second radius, said second radius smaller than said first radius.

The radar system is mounted on a moving platform moving with a component of motion in a direction along said great circle. The radar comprises a radar receiver for digitizing radar returns having a phase from said scatterer in said scene, and a computer for:

focusing said phase of said radar returns from said scatterer in said scene, said phase of said radar returns received from said scene focused for the motion of said moving platform along said great circle using cylindrical coordinates;

computing said synthetic aperture image from said radar returns;

making an initial position estimate of said scatterer within said synthetic aperture image using said cylindrical coordinates;

converting said initial position estimate from said cylindrical coordinates to geodesic coordinates of initial latitude, initial longitude and initial elevation;

extracting a second elevation from a database descriptive of earth's surface at said initial latitude and initial longitude location;

replacing said initial elevation with said second elevation;

computing a second target location using said second elevation;

comparing said second target location with said first target location to obtain a difference;

replacing said second target location for said initial position estimate if said difference is greater than a threshold;

repeating said converting step, said extracting step, said computing step said comparing step and said replacing step until said difference is less than said threshold.

DETAILED DESCRIPTION OF THE INVENTION

The present invention describes a method and apparatus for converting the location of a target within a SAR map into its precise geolocation, i.e. locating the target on the surface of the earth corresponding to the location of a SAR map.

The invention is applicable to RMA type motion compensation generally based on convolution operations. Generally, RMA consists of a two dimensional Fourier transform, then a multiply operation, a change of variables to arrive at rectilinear coordinates, and finally an inverse Fourier transform.

Figure 1:
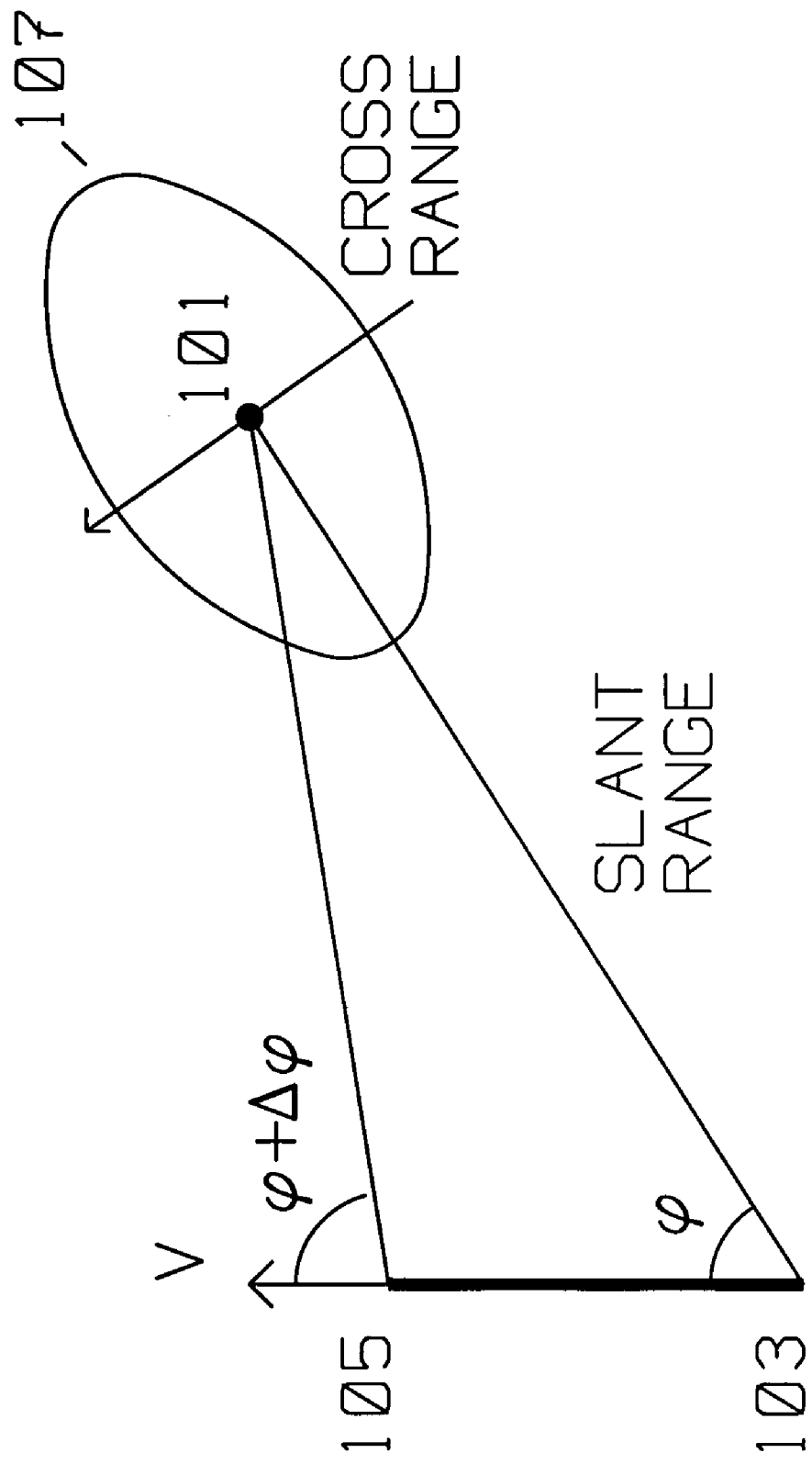
FIG. 1 is a SAR spotlight configuration of the prior art.

FIG. 1 shows the typical prior art geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during the frame length, and includes target area 101. Similarly, the antenna receive pattern covers area 107, and includes target area 101. Radar pulses are transmitted and corresponding returns received at many points during the frame length between position 103 and position 105. SAR radar is well known in the art and, for example, is described by W. Carrara, et al, in *Spotlight Synthetic Aperture Radar*, Artech house, 1995, incorporated herein be reference in its entirety.

In this invention, the CRMA motion compensation method, described in the parent application, is "inverted", that is, the target information is extracted to locate the target on a surface contained within a SAR image.

Figure 2:
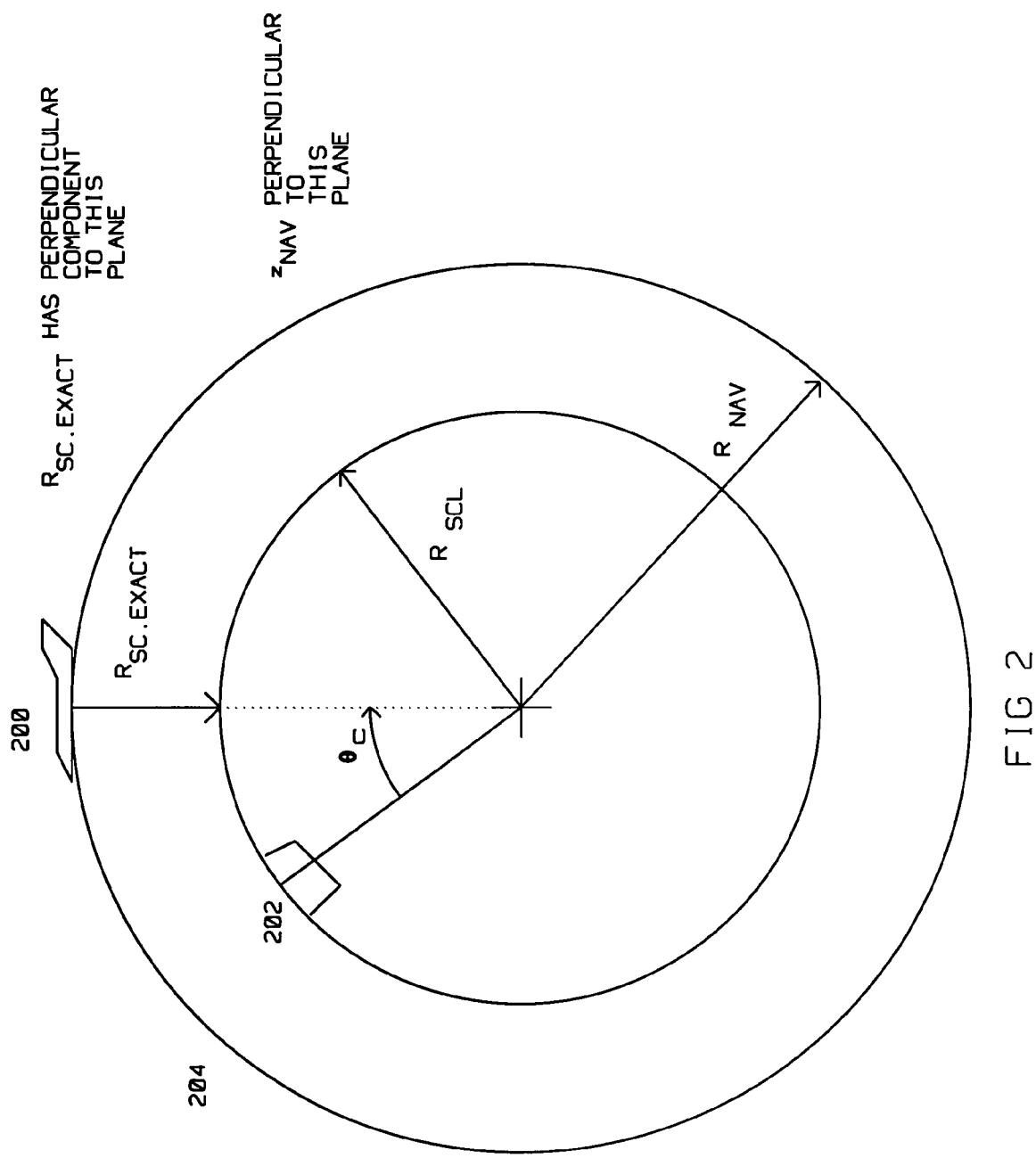
FIG. 2 is a side view of the cylindrical coordinates used in the present invention.

FIG. 2 shows a side view of the cylindrical coordinates used by the present invention where the trajectory of a moving platform 200 along a great circle 204 is shown. Target location 202 is on a curved earth surface. The variables will be referenced in subsequent calculations.

Figure 3:
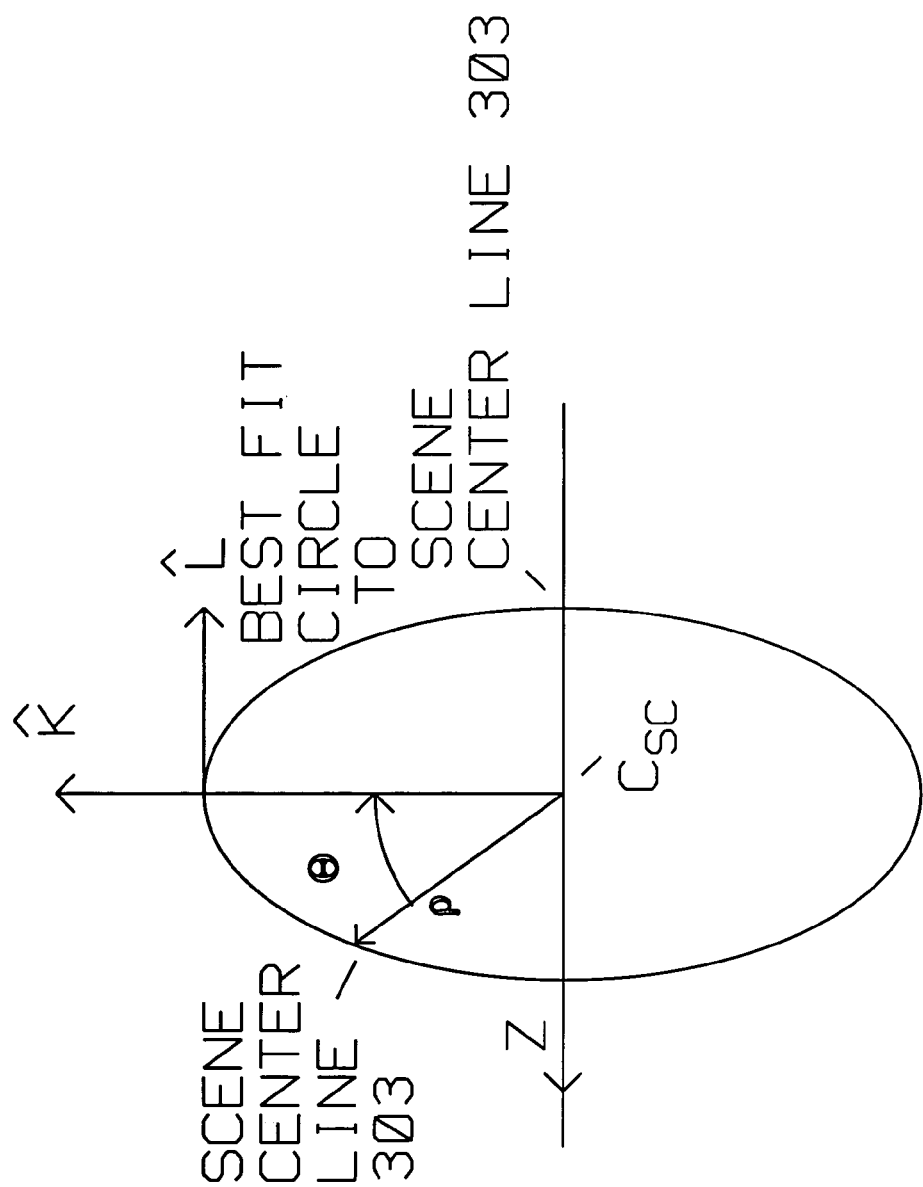
FIG. 3 is a diagram of the scene centerline used in the present invention.

Similarly, FIG. 3 delineates the best fit circle to scene center line 303, its center $C_{SC}$ and the scene center line 303.

Figure 4:
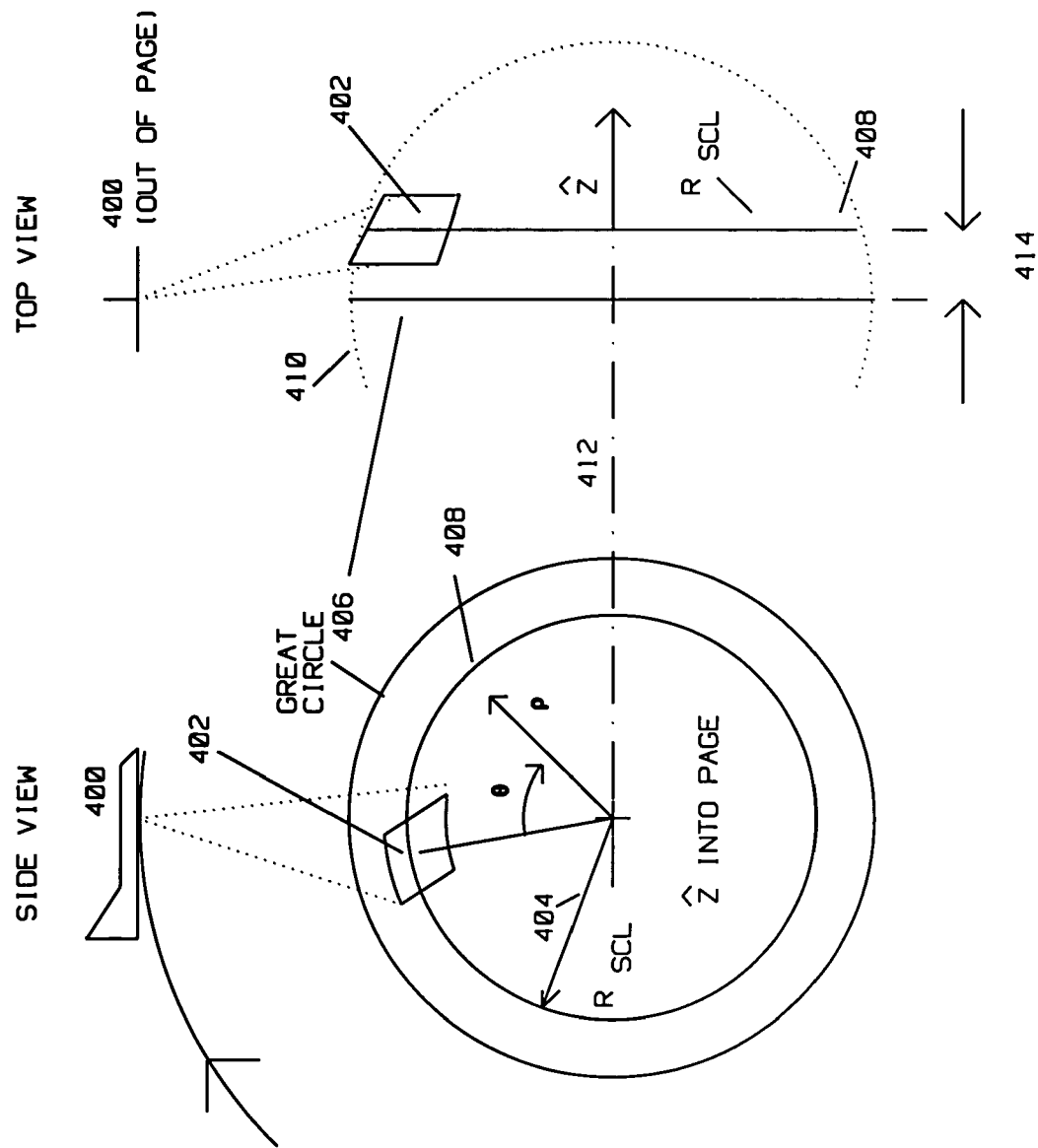
FIG. 4 shows the path of a moving platform (flying aircraft) following a great circle path for acquiring a SAR image and the geometry used in the present invention.

The method of the present invention uses a cylindrical coordinate system as shown in FIG. 4. FIG. 4 shows a SAR radar on moving platform (aircraft) 400 imaging a scene 402, where scene 402 is typically a small portion of the surface of the earth 410. As shown in FIG. 4, moving platform 400 follows a nominal path parallel along a great circle 406 of the earth 410. In the top view portion of FIG. 4, moving platform 400 is coming out of the page, thus scene 402 is to the left of the aircraft. Scene 402 is on a smaller circle, the local scene center line circle 408. Smaller local scene centerline circle 408 has the same axis 412 as that of great circle 406, however, the center of 408 is displaced by a distance 414 along the axis in the center of great circle 406. A great circle 406 is formed from the intersection of a great circle plane containing the earth's center point with the (nominal) ellipsoid describing the earth's surface. Because it is displaced with respect to great circle 406 along the axis of great circle 406, smaller local scene centerline circle 408 has by definition a smaller diameter than great circle 406, while parallel to great circle 406. Centerline circle 408 has a radius $R_{SCL}$.

Further shown in FIG. 4 is the $\hat{z}$ axis, pointing into the page for the side view, and along axis 412, towards the right in the top view. $\theta$ increases in the direction of moving platform 400 (aircraft) flight, and its origin is at the scene location. $\hat{z}$ is defined as $$\hat{z}=\hat{\rho}\times\hat{\theta}$$

Both the SAR swath mode and the spotlight mode are defined using a single point on the earth's surface. In swath SAR mode, this single point is the scene entry point. In SAR spotlight mode, this single point is the scene center point. In either case, the scene entry point or the scene center point can be projected onto the nominal earth surface. The projected point is the scene nadir point. In accordance with Euclidean Geometry, there exists a unique plane, parallel to a great circle plane, which contains the scene nadir point. This unique plane is the scene center line plane. The scene nadir line is the intersection of this unique plane with the nominal earth ellipsoid surface. The distance between the scene entry point for swath SAR mode, or the scene center point for SAR spotlight mode and its nadir point is the scene altitude Z. The set of all points with nadir points on the scene center nadir line with altitude equal to the scene altitude is the scene center line.

The Scene Center Line

The scene center line is a set of points of fixed altitude Z above the center nadir line. The direction of the altitude is defined by the local normal vector to the nominal earth ellipsoid. In general, the local normal vector on the scene center nadir line does not lie in the center scene center line plane. Consequently, the scene center line is a curve in three dimensions which does not lie in a single plane. Because the scene is NOT flat, being part of a sphere, it is parameterized by $\eta$ as described in the parent application(s).

Now, any point on the scene center line $x_{SC}$ can be found from:

$$x_{SC}=L_{SC}(\eta)$$

where $L_{SC}$ is a function of $R-R^3$, all of whose derivatives are continuous.

The Local Scene Center Line Circle 408 can locally be approximated by a circle. Circle 408 is defined by the local radius of curvature 404, $R_{SCL}(\eta)$ as described in the parent application.

The local scene center line circle 408 can be used to define a cylindrical coordinate system, $\rho$, $\theta$, z, centered at the center of 408, in FIG. 4, and detailed in the parent application.

I) Method Steps.

Figure 5:
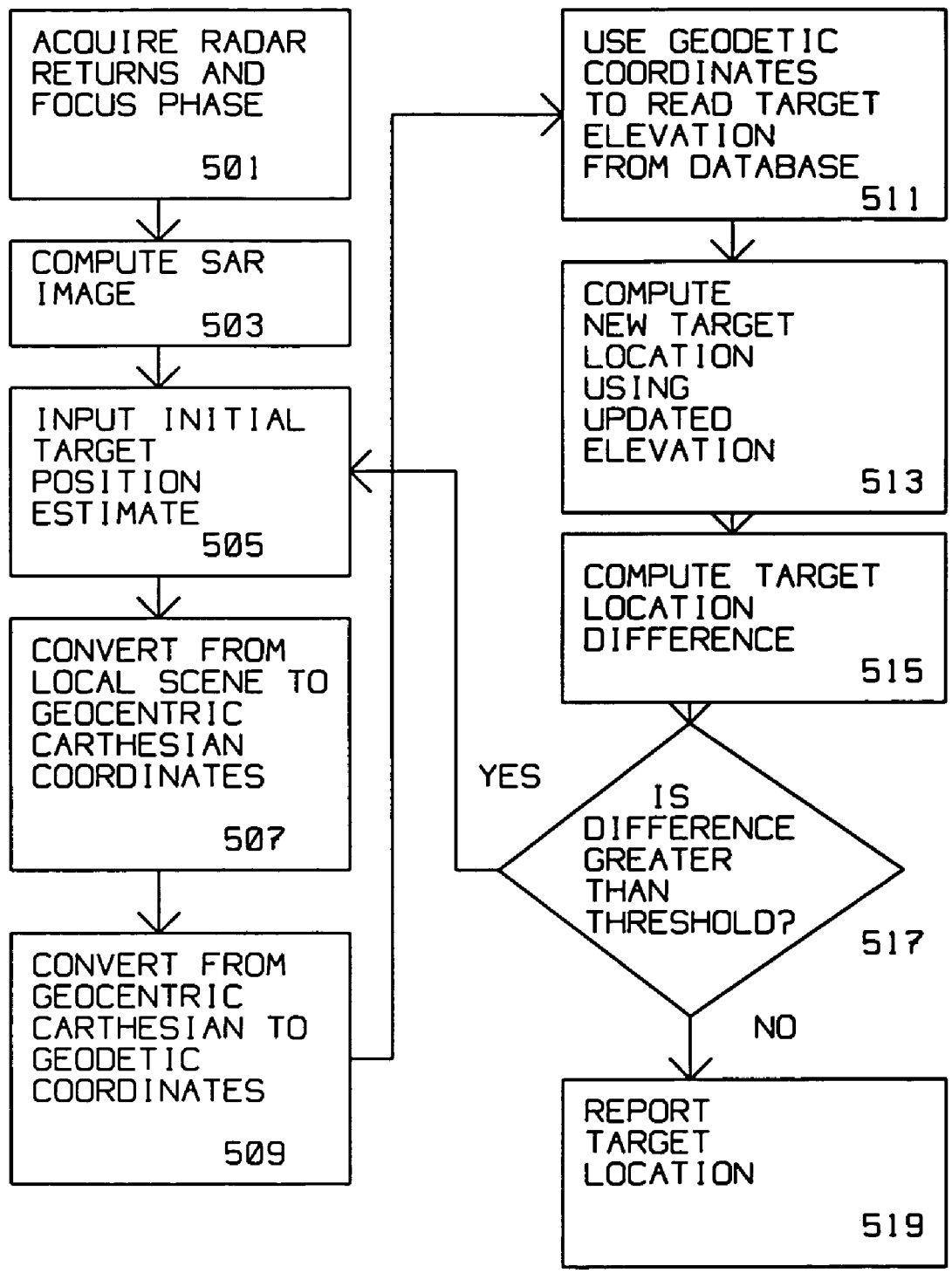
FIG. 5 shows the flow diagram for the method used in the present invention.

FIG. 5 shows the steps used in accurately geo-locating a target from a SAR image given a non-linear platform track and non-planar scene surface using the geometry in FIGS. 2, 3, and 4. Generally, a computer located on a moving platform is used to perform the method of this invention. The steps performed by the computer to execute the method are:

1) Acquire Radar returns and focus phase 501—Focusing the phase of radar returns from scatterer(s) in a scene. The scene is part of a spherical surface, part of the earth. The focusing is for the motion of the moving platform along a great circle. The focusing is performed based on using cylindrical coordinates, as detailed in the parent application(s).

2) Compute SAR image 503—Computing a synthetic aperture image from the focused radar returns. This is detailed in the parent application(s). See II) below—Application to the CRMA method.

3) Input initial target estimate 505—Making an initial position estimate (first order mensuration) of the scatterer(s)(targets) at an image plane location $x_{AT}$, $y_{CT}$ where AT refers to across track, and CT is cross track, within said synthetic aperture image. Using cylindrical coordinates, this position is converted to local scene cylindrical coordinates $\rho_{TM}$, $\theta_{TM}$, $z_{TM}$, target radial coordinate, target angular coordinate and target axial coordinate, respectively. This input is part of an iterative process. If the final computation of the location of the target is not within a threshold (see 515 and 517 below), the value computed on a first pass is introduced in this step as an initial estimate for a more accurate result.

This first order mensuration, i.e. an initial, first order (low accuracy) position estimate provides an approximate or "guessed" target location within a scene imaged by the SAR system. This initial estimate generates an initial target location for iteratively arriving in subsequent steps at a higher accuracy, precision computation of target location.

Initial (First Order) Computation Input Parameters:

$x_{AT}$—along track image coordinate $y_{CT}$—Cross track Image coordinate computed from $$y_T = \frac{y_{CT}}{\sigma_{TC}}$$

$\alpha_{SL}$—Tangent cone Apex parameter
$\sigma_{TC}$—Tangent cone Scale parameter
$\theta_C$—Angular difference between a target and a center of its aperture in local cylindrical coordinates From this, the initial target axial coordinate is:

$$z_{TM} = \sqrt{1-\alpha_{SL}^2} y_T$$

The initial target radial coordinate is $$\rho_{TM} = R_{SCL} - \alpha_{SL} y_T$$

The initial along track distance is $$x_T = x_{AT}(\rho_{TM} - R_{SCL})\tan(\theta_C)$$

The initial angular coordinate is $$\theta_{TM} = \frac{x_T}{R_{SCL}}$$

4) Convert from Local Scene, geocentric Cartesian coordinates 507—Obtain an initial estimate for $\vec{p}_{GCC}$ by converting the target location in the local scene cylindrical coordinates ($\rho_{TM}$, $\theta_{TM}$, $z_{TM}$) from 3 above to geocentric Cartesian coordinated using the Local Scene Cylinder to Geocentric Cartesian Coordinate Transformation.

This conversion is performed by using the following variables.

$\vec{C}_{SC}$—local scene cylinder origin vector;
$\hat{K}$—radial unit vector at leading edge of scene (patch);
$\hat{L}$—along track unit vector at leading edge of scene (patch);
$\rho$—radial coordinate;
$\theta$—angular coordinate;
$z$—axial coordinate.

For the cylindrical to rectangular conversion, first find the axial direction vector $$\hat{Z} = \hat{K} \times \hat{L}$$

then, the geocentric Cartesian vector $P_{GCC}$ for the target is given by $$\vec{P}_{GCC} = \vec{C}_{SC} + \rho(\hat{K}\cos\theta + \hat{L}\sin\theta) + \hat{Z}z$$

5) Convert from Geocentric to Geodetic coordinates 509—converts target coordinates from geocentric Cartesian computed in 507 to geodetic coordinates in use by surface databases.

Let $$\vec{P}_{GCC} = (x, y, z)^T$$

be a point in geocentric Cartesian coordinates and $$T_{GD,GCC}(\vec{P}_{GCC}) = \phi, \lambda, h$$

a point in geodetic coordinates

Then $$\lambda = \tan^{-1}\left(\frac{y}{x}\right)$$
$$\rho = \sqrt{x^2 + y^2}$$
$$\sin\phi_0 = \frac{z}{\sqrt{\rho^2 + z^2}}$$

Iterate over the next two equations until $|\phi_{n+1} - \phi_n| < 0.01 \hat{s}$:

$$z_{o,n} = -\frac{R_E e^2 \sin\phi_n}{\sqrt{1 - e^2 \sin^2\phi_n}}$$

$$\sin\phi_{n+1} = \frac{z - z_{o,n}}{\sqrt{\rho^2 + (z - z_{o,n})^2}}$$

$\hat{s}$ is in the order of 10 feet, but can be reduced as the focussing accuracy improves.

Then, $$\phi = \sin^{-}(\sin\phi_{n+1})$$

$$h = \sqrt{\rho^2 + (z - z_{o,n})^2} - \frac{R_E}{\sqrt{1 - e^2 \sin^2\phi_{n+1}}}$$

h is an initial target elevation at a specific, initial latitude and longitude.

6) Use geodetic coordinates to read target elevation from database 511—In this step, the specific latitude and longitude from 509 is used to extract a second elevation of the target from a database descriptive of earth's surface at said initial latitude and initial longitude target location. Input target coordinates $T_{GD,GCC}$ into a planetary surface database such as, for example, Digital Terrain Elevation Data (MIL-D-89020, Rev B or higher) for the computed initial latitude and longitude computed in 5 above. Extract the altitude stored within the database, $Alt_{TGT}$, for the particular initial latitude and longitude.

Compute new target location using updated elevation 513—replace the initial elevation computed in 5 above with a second elevation $Alt_{TGT}$ obtained from the database in 6 above.

Compute a second target location using the second elevation. Obtain an updated (more accurate) value of $\vec{p}_{GCC}$ by converting $Lat_{TGT}$, $Lon_{TGT}$ and $Alt_{TGT}$ to geocentric Cartesian coordinates using:

$R_E$—Earth's equatorial radius
$e^2$—Earth eccentricity squared
$\vec{P}_{GD} = (\phi_d, \lambda_d, h_d)$—Geodetic input point Now $$\rho = \left[ \frac{R_E}{\sqrt{1 - e^2 \sin^2 \phi_d}} + h_d \right] \cos \phi_d$$

Calculate $z_o$, the point on the z axis where the geodetic normal intersects the axis $$z_0 = -\frac{R_E e^2 \sin \phi_d}{\sqrt{1 - e^2 \sin^2 \phi_d}}$$

The geocentric coordinates of the new, updated target location now is $x = \rho \cos \lambda_d$ $y = \rho \sin \lambda_d$ $z = z_0 + \rho \tan \phi_d$ 8) Compute target location difference 515—compare said second (updated) target location with said first target location to obtain a difference $\Delta x_{AT}, \Delta y_{AT}$
Compute $\Delta x_{AT} = x_{AT} - x_{AT,TMP}$ $\Delta y_{AT} = y_{AT} - y_{AT,TMP}$ 9) Is difference greater than a threshold? 517—If the corrections i.e. the difference between the initial target position input in 505 and the corrected target position exceeds a pre-selected threshold, the corrected target position is input into 505 as the initial target position estimate, and the process is repeated through steps 507, 509, 511, 513 and 515. That is, said converting step, said extracting step, said computing step said comparing step and said replacing step until are repeated until said difference is less than said threshold.

Target location is computed and refined from the second target location, then converted to an image location ($x_{AT,TMP}, y_{CT,TMP}$) corresponding to $p_{GCC}$. This is done by converting the second target location from Geocentric Cartesian Coordinates to Local Scene Cylinder coordinates $\rho$, $\theta$, z using a precision mensuration method.

This precision algorithm computes the location on the image plane specified as an along track and cross track distance to a point in a geodetic coordinate system.

The required inputs are:
$x_{AT}$ along track image coordinate
$y_{CT}$ cross track image coordinate
$R_{NAV}$ navigation track radius
$C_{SC}$ Local Scene Cylinder Origin
$\hat{K}$ Radial unit vector at leading edge of scene (patch).
$\hat{L}$ Along track vector at leading edge of scene (patch).
$p_z$ Perpendicular distance from navigation circle to scene centerline circle
$\theta_C$ Angular difference between a target and the center of its aperture in local cylindrical coordinates
$k_L$ Left/right look flag
$R_{SC,EXACT}$ Cross track offset to scene centerline
$\alpha_{SL}$ Tangent Cone Apex parameter
$\sigma_{TC}$ Tangent Cone Scale Parameter
Next, the radius of the sample surface at z, $\rho_{SAMP}$ is computed. The sample surface is that surface which is traced out by the line of sight vector as it moves along the scene center line. The line of sight vector is the vector from a moving platform (aircraft) location to the scene centerline. The scene entry point and the center of the aperture of the scene entry point are used as the nominal positions. The sample surface has rotational symmetry thus these results will hold for all points in a scene, or subset thereof, a patch.

The nominal scene entry point is defined by $x_{se} = R_{SCL}$, $y_{se} = 0$ and $z_{se} = 0$
The nominal moving platform (aircraft) location is $x_{nav} = R_{NAV} \cos(\theta_C)$ $y_{nav} = R_{NAV} \sin(\theta_C)$ $z_{nav} = -p_z k_l$ The parametrization of the line between these two points is determined by two slopes $$m_x = \frac{x_{nav} - x_{se}}{z_{nav} - z_{se}}$$

$$m_y = \frac{y_{nav} - y_{se}}{z_{nav} - z_{se}}$$

Therefore the components of the line of sight are:

$x_{comp} = m_x(z - z_{se}) + x_{se}$ $y_{comp} = m_y(z - z_{se}) + y_{se}$

Thus, the radius is $\rho_{SAMP} = \sqrt{x_{COMP}^2 + y_{COMP}^2}$

Now, $\rho_{SAMP}$ is used to find the height above the sample surface and the difference between the sample surface and the scene center line.

The height above the sample surface is given by $h_T = \rho - \rho_{SAMP}$

The difference between the sample surface and the scene center line is $dh_t = R_{SCL} - \rho_{SAMP}$ The angular component of the along track target position is $x_T = R_{SCL} \theta$ The along track image location of the target in meters is the result of $x_t$ above, corrected for height:

$x_{AT} = x_T - h_t \theta_c$

The z position of the navigation track in the local scene coordinate system is $z_{NAV} = -p_z k_L$ The cross track range to target, $R_{B,TCT}$ is given by $$R_{B,TGT} = \sqrt{(\rho - R_{NAV})^2 + (z - z_{NAV})^2 + 4\rho R_{NAV} \sin^2 \frac{(\theta_C)}{2} - \frac{R_{NAV}}{R_{SCL}} \rho^2 \sin\theta_C \tan\theta_C}$$

The cross track image position is given by the difference between the cross track range and the cross track range to the scene center line, corrected for the difference between the scene center line radius and the sample surface, $$y_{CT} = \left[R_{B,TGT} - R_{SC,EXACT} - dh_T\left[\frac{R_{NAV}}{2R_{SC,EXACT}}\right]\theta_C^2\right]k_L$$

The correct target location computation shifts a geocentric Cartesian position vector by a vector distance corresponding to an along track and cross track distance in the image surface. The conversion requires a conversion from geocentric Cartesian coordinates to local scene cylinder coordinates using the Geocentric Cartesian to Local Scene Cylinder method described above. The result is a local image position $(\rho_{TM}, \theta_{TM}, z_{TM})$.

The correction distance in the earth tangent cone is $$\Delta y_t = \frac{\Delta y_{CT}}{\sigma_{TC}}$$

These are the corrections to target position:

$$\Delta z_{TM} = \sqrt{1-\alpha_{SL}^2}\,\Delta y_T$$

$$\Delta \rho_{TM} = \alpha_{SL}\Delta y_T$$

$$\Delta \theta_{TM} = \frac{\Delta x_{AT}}{R_{SCL}}$$

The corrections are applied to obtain $$z_{TM} = z_{TM} + \Delta z_{TM}$$

$$\rho_{TM} = \rho_{TM} + \Delta \rho_{TM}$$

$$\theta_{TM} = \theta_{TM} + \Delta \theta_{TM}$$

$\vec{p}_{GCC,NEW}$ is obtained by converting the corrected $(\rho_{TM}, \theta_{TM}, z_{TM})$ back to geocentric Cartesian coordinates using the Local Scene Cylinder to Geocentric Cartesian Coordinate transformation method detailed in (4) above.

10) Report target location 519—If the difference is less than said threshold, the computation is complete, the target location is refined in 517, then reported.

II) Application to the Conformal Range Migration Algorithm (CRMA) Method

Conversion from Image Pixel Index to Image Coordinates

The method described herein assumes that the image pixel location is available as a distance (typically in meters or feet) from a reference point, typically the scene entry point, or a subset thereof, such as the patch entry point. If the pixel location is known, this distance can be computed by multiplying the distance in pixels in the along track and cross track directions by the pixel spacing (in meters or feet).

The parameters required for using the present invention are computed explicitly as part of the CRMA, as described in the parent application(s). The following parameters are also useful.

The perpendicular distance from the navigation circle to the scene center line circle is given by:

$$p_z = |Z_{SCL} - Z_{ac}|$$

The left/right look flag is $$k_L = \frac{Z_{SCL} - Z_{NAV}}{|Z_{SCL} - Z_{NAV}|}$$

The angular difference between a target and the center of its aperture in local cylindrical coordinates is computed by:
a) Computing the radial component of the offset:

$$p_k = \sqrt{R_{NAV}^2 \sin^2\alpha_0 - R_{SCL}^2(\cos^2\alpha_0 - \cos^4\alpha_0) - p_z^2\cos^2\alpha_0} + \cos^2\alpha_0 R_{SCL}$$

b) Computing the along track component of the offset $$p_l = -\cot\alpha_0 \sqrt{(p_k - R_{SCL})^2 + p_z^2}$$

Now, $$\theta_C = \arctan\frac{(p_l)}{(p_k)}$$

$R_{SC,EXACT}$ is computed from:

$$R_{SC,EXACT} = \frac{}{\sqrt{(R_{SCL} - R_{NAV})^2 + p_Z^2 + 4R_{SCL}R_{NAV}\sin^2\left(\frac{\theta_C}{2}\right)} - R_{SCL}R_{NAV}\sin(\theta_C)\tan(\theta_C)}$$

Now compute the local earth tangent cone parameter $\alpha_{sl}$ and $\sigma_{TC}$. This requires the earth normal at a point on the scene center line. Choose the scene center point. The earth normal $\hat{A}$ at this point is perpendicular to the plane of the scene. The radial component of this vector $$A_p = <\hat{A}, \hat{K}>$$

The slope of the local earth tangent cone is $$\alpha_{SL} = \sqrt{1-A_P^2}$$

$\sigma_{TC}$ is computed from:

$$\sigma_{TC} = \frac{-\alpha_{SL}(R_{SCL}-R_{NAV}) + p_z\sqrt{1-\alpha_{SL}^2} - 2\alpha_{SCL}R_{NAV}\sin^2\left(\frac{\theta_C}{2}\right) + \alpha_{SAL}R_{NAV}\sin\theta_C\tan\theta_C}{R_{SC,EXACT}}$$

Geocentric Cartesian to Local Scene Cylinder Coordinate Transformation

Within 513 there is a need to return to the Local Scene Coordinate system. The inputs are $\vec{C}_{SC}$—Local Scene cylinder Origin Vector
$\hat{K}$—Radial unit vector at leading edge of scene
$\hat{L}$—Along Track unit vector at leading edge of scene (or patch)
$\vec{p}_{GCC}$—Geocentric Cartesian position vector
This is a rectangular to cylindrical conversion.
First, compute the axial direction vector $$\hat{Z} = \hat{K} \times \hat{L}$$

Then compute the three local components:

$$z = \langle \vec{p}_{GCC} - C_{SC}, \hat{Z} \rangle$$

$$k_{comp} = \langle \vec{p}_{GCC} - C_{SC}, \hat{K} \rangle$$

$$l_{comp} = \langle \vec{p}_{GCC} - C_{SC}, \hat{L} \rangle$$

Now, convert to radial and angular coordinates $$\rho = \sqrt{k_{comp}^2 + l_{comp}^2}$$

$$\theta = \arctan\left[\frac{l_{comp}}{k_{comp}}\right]$$

All references cited in this document are incorporated herein in their entirety by reference.

Although presented in exemplary fashion employing specific embodiments, the disclosed structures are not intended to be so limited. For example, although the earth is referenced as a generally spherical surface (ellipsoid) where a moving platform follows a great circle path and the scene is located along side the great circle path, the geometric imaging/ranging principles are applicable to any planet or spherical body both big or small, such as spherical components used in ball bearings.

Those skilled in the art will also appreciate that numerous changes and modifications could be made to the embodiment described herein without departing in any way from the invention.

The invention claimed is:

1. A radar for acquiring a synthetic aperture image of a scene on earth,
    said earth having a great circle centered with respect to said earth's center, an axis passing through said earth's center and a first radius,
    said great circle contained in a first plane,
    said scene having a radar scatterer,
    said scene on said earth, said scene adjacent to said great circle on a local scene centerline circle, said centerline circle in a second plane, said second plane parallel to said first plane, said centerline circle having a second radius, said second radius smaller than said first radius,
    said radar system mounted on a moving platform moving with a component of motion in a direction along said great circle, said radar comprising:
    a radar receiver for digitizing radar returns having a phase from said scatterer in said scene, and
    a computer for
    focusing said phase of said radar returns from said scatterer in said scene, said phase of said radar returns received from said scene focused for the motion of said moving platform along said great circle using cylindrical coordinates;
    computing said synthetic aperture image from said radar returns;
    making an initial position estimate of said scatterer within said synthetic aperture image using said cylindrical coordinates;
    converting said initial position estimate from said cylindrical coordinates to geodesic coordinates of initial latitude, initial longitude and initial elevation;
    extracting a second elevation from a database descriptive of earth's surface at said initial latitude and initial longitude location;
    replacing said initial elevation with said second elevation;
    computing a second target location within said synthetic aperture image using said second elevation;
    comparing said second target location with said first target location to obtain a difference;
    replacing said second target location for said initial position estimate if said difference is greater than a threshold;
    repeating said converting step, said extracting step, said computing step said comparing step and said replacing step until said difference is less than said threshold.

2. A radar system as described in claim 1 wherein said second target location is refined by
    converting the second target location from Geocentric Cartesian Coordinates to Local Scene Cylinder coordinates $\rho$, $\theta$, $z$
    computing the radius of a sample surface at z, $\rho_{SAMP}$ said sample surface tracing out a line of sight vector as said line of sight moves along said scene center line wherein a nominal scene entry point is defined by $x_{se} = R_{SCL}$, $y_{se} = 0$ and $z_{se} = 0$;
    a nominal moving platform (aircraft) location is defined by $$x_{nav} = R_{NAV} \cos(\theta_C)$$

$$y_{nav} = R_{NAV} \sin(\theta_C)$$

$$z_{nav} = -p_z k_l$$

and
    the parametrization of a line is determined by two slopes $$m_x = \frac{x_{nav} - x_{se}}{z_{nav} - z_{se}}$$

$$m_y = \frac{y_{nav} - y_{se}}{z_{nav} - z_{se}}$$

thereby generating components of said line of sight $$x_{comp} = m_x(z - z_{se}) + x_{se}$$

$$y_{comp} = m_y(z - z_{se}) + y_{se}$$

for computing a radius $$\rho_{SAMP} = \sqrt{x_{COMP}^2 + y_{COMP}^2}$$

where $\rho_{SAMP}$ is a height above said sample surface.

3. A radar system as in claim 2 wherein said height above said sample surface is given by $$h_T = \rho - \rho_{SAMP}$$

a difference between said sample surface and said scene center line is $$dh_t = R_{SCL} - \rho_{SAMP}$$

and an angular component of an along track target position is $$x_T = R_{SCL} \theta$$

4. A radar system as in claim 3 wherein said refined target location computation shifts a geocentric Cartesian position vector of said second location of said target by a vector distance corresponding to an along track and cross track distance on said image surface.

5. A method for acquiring a synthetic aperture image of a scene on earth,
    said earth having a great circle centered with respect to said earth's center, an axis passing through said earth's center and a first radius, said great circle contained in a first plane,
said scene having a radar scatterer,
said scene on said earth, said scene adjacent to said great circle on a local scene centerline circle, said centerline circle in a second plane, said second plane parallel to said first plane, said centerline circle having a second radius, said second radius smaller than said first radius,
said radar system mounted on a moving platform moving with a component of motion in a direction along said great circle, said method comprising the steps of:
digitizing radar returns having a phase from said scatterer in said scene;
focusing said phase of said radar returns from said scatterer in said scene, said phase of said radar returns received from said scene focused for the motion of said moving platform along said great circle using cylindrical coordinates;
computing said synthetic aperture image from said radar returns;
making an initial position estimate of said scatterer within said synthetic aperture image using said cylindrical coordinates;
converting said initial position estimate from said cylindrical coordinates to geodesic coordinates of initial latitude, initial longitude and initial elevation;
extracting a second elevation from a database descriptive of earth's surface at said initial latitude and initial longitude location;
replacing said initial elevation with said second elevation;
computing a second target location within said synthetic aperture image using said second elevation;
comparing said second target location with said first target location to obtain a difference;
replacing said second target location for said initial position estimate if said difference is greater than a threshold;
repeating said converting step, said extracting step, said computing step said comparing step and said replacing step until said difference is less than said threshold.

6. A method as described in claim 5 wherein said second target location is refined by the steps of:
converting the second target location from Geocentric Cartesian Coordinates to Local Scene Cylinder coordinates $\rho$, $\theta$, $z$
computing the radius of a sample surface at z, $\rho_{SAMP}$ said sample surface tracing out a line of sight vector as said line of sight moves along said scene center line wherein a nominal scene entry point is defined by $x_{se}=R_{SCL}$, $y_{se}=0$ and $z_{se}=0$;
a nominal moving platform (aircraft) location is defined by $$x_{nav}=R_{NAV}\cos(\theta_C)$$

$$y_{nav}=R_{NAV}\sin(\theta_C)$$

$$z_{nav}=-p_z k_l$$

and
the parametrization of a line is determined by two slopes $$m_x = \frac{x_{nav} - x_{se}}{z_{nav} - z_{se}}$$

$$m_y = \frac{y_{nav} - y_{se}}{z_{nav} - z_{se}}$$

thereby generating components of said line of sight $$x_{comp}=m_x(z-z_{se})+x_{se}$$

$$y_{comp}=m_y(z-z_{se})+y_{se}$$

for computing a radius $$\rho_{SAMP}=\sqrt{x_{COMP}^2+y_{COMP}^2}$$

where $\rho_{SAMP}$ is a height above said sample surface.

7. A method as in claim 6 wherein said height above said sample surface is given by $$h_T=\rho-\rho_{SAMP}$$

a difference between said sample surface and said scene center line is $$dh_t=R_{SCL}-\rho_{SAMP}$$

and an angular component of an along track target position is $$x_T=R_{SCL}\theta$$

8. A method as in claim 7 wherein said refined target location computation shifts a geocentric Cartesian position vector of said second location of said target by a vector distance corresponding to an along track and cross track distance on said image surface.

* * * * *